United States Patent [19]
Young

[11] Patent Number: 5,337,991
[45] Date of Patent: Aug. 16, 1994

[54] LOW RESONANT FREQUENCY VIBRATION ISOLATION SYSTEM

[76] Inventor: Russell D. Young, 852 Riverside Dr., Pasadena, Md. 21122

[21] Appl. No.: 834,898

[22] Filed: Feb. 11, 1992

[51] Int. Cl.$^5$ .......................................... F16M 11/00
[52] U.S. Cl. ..................... 245/636; 248/562; 267/113
[58] Field of Search ............. 248/636, 631, 638, 562, 248/544; 267/113

[56] References Cited

U.S. PATENT DOCUMENTS

| | | | |
|---|---|---|---|
| 3,189,303 | 6/1965 | Boothe | 248/631 X |
| 3,415,478 | 12/1968 | Williams, III . | |
| 3,429,544 | 2/1969 | Williams, III . | |
| 3,459,395 | 8/1969 | Scotto | 248/562 X |
| 3,672,473 | 6/1972 | Verhagen . | |
| 3,679,159 | 7/1972 | Bach et al. . | |
| 3,730,473 | 5/1973 | Pepi . | |
| 4,074,474 | 2/1978 | Cristy | 248/631 X |
| 4,546,960 | 10/1985 | Abrams et al. . | |
| 4,645,171 | 2/1987 | Heide . | |
| 4,648,577 | 3/1987 | Weber | 248/636 X |
| 4,730,541 | 3/1988 | Greene . | |
| 4,848,525 | 7/1989 | Jacot et al. . | |
| 4,850,261 | 7/1989 | Greene . | |
| 5,000,415 | 3/1991 | Sandercock . | |
| 5,197,707 | 3/1993 | Kohan | 248/562 X |

FOREIGN PATENT DOCUMENTS

| | | | |
|---|---|---|---|
| 0204347 | 12/1982 | Japan | 248/562 |
| 1052756 | 11/1983 | U.S.S.R. | 248/562 |

OTHER PUBLICATIONS

Laser Focus World, Dec. 1991, "Vibration Isolator Features Hybrid Chamber Design", p. 13.
1989 Laser Focus World Buyers' Guide, pp. 544–552.
Newport Scientific Company Brochure, pp. A-2 to A≧26.

*Primary Examiner*—Karen J. Chotkowski

[57] ABSTRACT

A support system for supporting an experimental apparatus or a prime mover and decoupling the same from the environment comprises a vessel immersed in a tank of liquid and having support structure extending out of the liquid to support the experimental apparatus or prime mover. The mass of the total combination of the vessel, support structure, and experimental apparatus is adjusted with respect to the density of water so that the support system exhibits neutral buoyancy. Preferably the support structure is of small cross-sectional area so that a small additional mass or a force such as vibratory energy applied to the experimental apparatus produces a large excursion of the system within the water. In this way the system experiences substantial static deflection upon addition of a small additional mass, or the imparting of a small force thereto, and exhibits an extremely low resonant frequency. The device may also be readily adapted for use as a low resonant frequency oscillator.

22 Claims, 1 Drawing Sheet

LOW RESONANT FREQUENCY VIBRATION ISOLATION SYSTEM

BACKGROUND OF THE INVENTION

1. Field of the Invention

This invention relates to a vibration isolation device for efficiently decoupling an experimental instrument or source of vibration from its environment at frequencies above an extremely low resonant frequency.

2. Description of the Prior Art

There is considerable prior art relating to the subject of decoupling sources of vibration from the environment or, conversely, isolating experimental instruments and the like from vibration in their environment. In the former case, it is often desired to separate a prime mover such as an electric motor from its environment so that vibration generated by the prime mover is absorbed and is not communicated to associated equipment. In the latter case, it is often desired to decouple an experimental apparatus, such as a delicate laboratory instrument, from its environment so that vibration in the environment does not interfere with the experimental measurement being made.

Various devices have been provided to address these problems. A first class of devices are found in references disclosing highly rigid table tops intended to be supported on supports exhibiting relatively low resonant frequency. See U.S. Pat. No. 4,645,171 to Heide, and brochures published by Newport Scientific Company and other manufacturers of such equipment.

The art has also attempted to develop active-servo vibration isolation systems, that is, in which vibration is sensed and opposed by an actively driven servo system. See generally Greene U.S. Pat. Nos. 4,730,541 and 4,850,261; Pepi U.S. Pat. No. 3,730,473; Abrams et al U.S. Pat. No. 4,546,960; Jacot et al U.S. Pat. No. 4,848,525; and Sandercock U.S. Pat. No. 5,000,415.

Generally related prior disclosures include U.S. Pat. No. 3,679,592 to Bach et al showing a vibration isolation structure including opposed plates supported by interlocking flexible fluid filled containers, and U.S. Pat. Nos. 3,415,478 and 3,429,544, both to Williams for air tables.

Also generally pertinent is U.S. Pat. No. 3,672,473 for a pendulum system issued to Verhagen. The Verhagen patent shows a pendulum system for "stabilization purposes" or for use as a very low resonant frequency oscillator for measurement of wave energy in the sea or the like; see column 3, lines 20–25. The Verhagen pendulum system includes a pendulum suspended in a liquid filled volume, the density of the pendulum being controlled to be closely comparable to that of the liquid to provide an oscillation period of between 75 to 150 seconds; that is, the pendulum has a very low resonant frequency between 0.0133 and 0.00666 Hz. However, even assuming the Verhagen pendulum system achieves as stated a very low resonant frequency, and thus would be substantially unaffected by high frequency vibration, this system cannot be adapted for supporting experimental apparatus or motors.

OBJECTS AND SUMMARY OF THE INVENTION

It is therefore an object of the invention to provide a vibration isolating support system having a very low resonant frequency, on which a vibrating machine may be supported to decouple the environment from the machine, or conversely on which a very sensitive instrument or the like may be mounted so that the instrument does not experience any vibration due to its environment. The device of the invention may also be used as a very low resonant frequency oscillator having application in monitoring passage of ships, detection of swaying of bridges, buildings or other large structures, measurement of the frequency of wave energy and the like.

The low resonant frequency support system according to the present invention comprises a buoyant vessel immersed in a liquid. Typically a support member of relatively small cross section extends above the surface of the liquid from the vessel to a support table for supporting a vibrating machine, an experimental instrument, or the like. The total mass of the support system, that is, the total mass of the vessel immersed in the liquid plus the mass of the support table and the instrument, is adjusted with respect to its buoyancy so that the support system is supported by the liquid with effectively neutral buoyancy. The cross-sectional area of the support member extending out of and above the liquid is made relatively small, e.g., by employing a hollow perforated tube as a support member. In this way, relatively small additions of weight to the total mass, or imparting of relatively small forces such as vibratory energy to the experimental apparatus, result in relatively large-amplitude motion of the immersed buoyant vessel. The inertia of the vessel, coupled with the neutral buoyancy of the total mass of the support system, tends to damp out all but the lowest-frequency energy. This system provides a compact model of a mechanical system wherein an extremely long spring is stretched substantially upon addition of a relatively small additional extension force. Such a system has an extremely low resonant frequency; therefore the vibration decoupling apparatus can be used, for example, to support scientific instruments and effectively decouples all but the lowest frequency energy from the experimental apparatus.

Essentially the same structure can function as a low resonant frequency oscillator for use in measuring the frequency of wave energy in water or the like.

BRIEF DESCRIPTION OF THE DRAWINGS

The invention will be better understood if reference is made to the accompanying drawings, in which:

FIG. 2 is a schematic cross-sectional view of an apparatus according to the invention arranged as a low resonant frequency oscillator designed to measure the frequency of wave energy in the ocean, of energy imparted to large structures, or the like.

DESCRIPTION OF THE PREFERRED EMBODIMENTS

Figure 1:
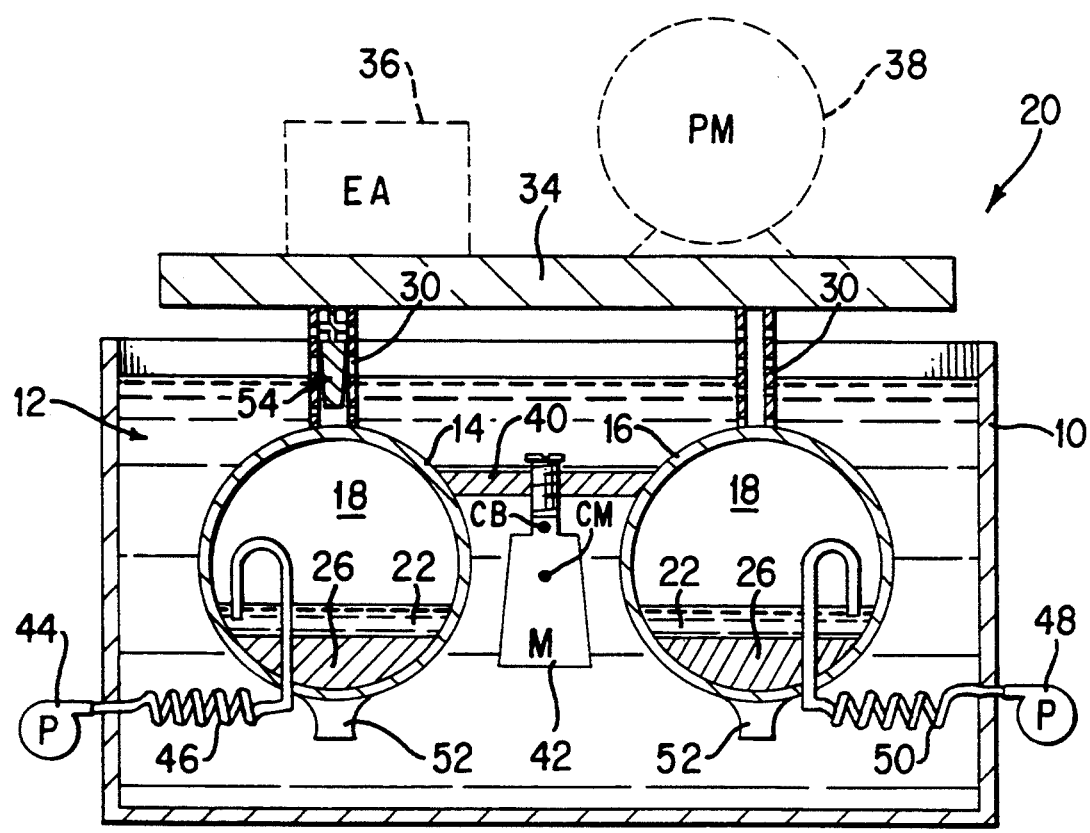
FIG. 1 is a schematic cross-sectional view of the apparatus of the invention arranged as a support for an experimental apparatus or prime mover.

The low resonant frequency support apparatus of the invention shown in FIG. 1 includes a tank 10 containing a quantity of fluid (typically water) 12. One or more buoyant vessels 14 and 16 (two being shown in this exemplary embodiment) each include a volume of air or another gas 18, a quantity of liquid ballast 22 and a solid mass 26. Vessels 14 and 16 are connected by weight bearing support members 30 to an experimental table 34 on which may be supported an experimental apparatus (EA) 36, a prime mover (PM) 38, or another vibrating machine. The vessels 14 and 16 are connected by a rigid member 40 so that they do not move whatsoever with respect to one another. In this way the vessels effectively behave as one with respect to isolation of the experimental apparatus 36 from vibration from the environment, or conversely to isolate vibration produced by the prime mover 38 from the environment. The principles of the invention are equally applicable to systems including differing numbers of rigidly coupled buoyant vessels.

According to one important aspect of the invention, the total mass of the complete support system 20, that is, the total mass of the vessels 14 and 16, the connecting member 40, an auxiliary mass 42 if used, the support members 30, the experimental table 34, and the experimental apparatus 36, is controlled with respect to the density of the liquid 12 in tank 10 so that the support system 20 is supported with essentially neutral buoyancy.

According to another important aspect of the invention, the total cross-sectional area of the support members 30 is minimized insofar as possible while providing adequate structural rigidity. For example, the support members 30 may be configured as perforated tubes, as shown. Minimizing the cross-sectional area of the support members, that is, the amount of solid material of the support members, minimizes the additional mass submerged as weight is added to the experimental table. Accordingly, the amount of liquid 12 displaced as weight is added to table 34 is minimized, so that the buoyant vessels 14 and 16 are substantially further submerged as weight is added. As shown in detail below, minimizing the cross-sectional area of the support members 30 in this manner reduces the resonant frequency of the support system of the invention, in accordance with the objects of the invention mentioned above.

For convenient adjustment of the buoyancy of the support system 20, for example as equipment is added to the experimental apparatus 36, vessels 14 and 16 may contain a variable amount of liquid ballast 22. Variation in the amount of liquid ballast allows the relative buoyancy of vessels 14 and 16 to be adjusted so that the total mass of the support system 20 is supported at neutral buoyancy by the liquid 12. Liquid ballast 22 may be added to or withdrawn from the vessel 14 as needed by pump 44, connected to the interior of the vessel 14 by resilient tubing 46, to prevent any vibration from the environment outside tank 10 from being communicated thereby to the vessel 14. A similar arrangement including pump 48 and tubing 50 is provided to adjust the buoyancy of additional vessels such as vessel 16, for the same purpose.

Resilient tubing 46 and 50, together with further similarly resilient anchoring members (not shown) as needed, also serve to center the vessels 14 and 16 within tank 10, that is, prevent vessels 14 and 16 from contacting the wall of tank 10. Tubes 46 and 50 as well as any anchoring devices are preferably curled, as shown, to avoid transmitting vibration therealong as might occur if these members were under tension. The resilient nature of tubes 46 and 50 and of any further anchoring devices provides isolation of the vessels 14 and 16 from environmental vibration in the horizontal plane, while the buoyant nature of vessels 14 and 16 provides isolation from vibration in the vertical plane. Increasing the resiliency of tubing 46 and 50 and anchoring members reduces the resonant frequency of vibration transmitted thereby to the vessels 14 and 16. As the support system is supported at neutral buoyancy, all direct connection between tank 10 and vessels 14 and 16 is avoided. Accordingly, the inertia of the total mass of the system is effective to damp out all vibrational energy at frequencies above the resonant frequency of the system.

Regardless of the shape of the vessels 14 or 16, or the specifics of the support members 30 and the table 34, it is important to the practice of the invention that a relatively slight change in the mass on the table 34, or the imparting of vibratory energy thereto, causes a relatively great excursion of the vessel 14 within the liquid 12 in tank 10. This condition is achieved if the total mass of the support system 20 is adjusted with respect to the density of the liquid 12 to achieve neutral buoyancy of the total mass, and if the cross-sectional area of the support members 30 is minimized.

If these conditions are satisfied, the addition of a small amount of weight, e.g., on the table 34, will cause a relatively great excursion of the vessel 14 with respect to the liquid 12; that is, the static equilibrium position of the vessel 14 with respect to the liquid 12 will be substantially different after the addition of additional weight than before. Similarly, because according to the invention the total mass is supported at neutral buoyancy, imparting a relatively small force such as vibratory energy, e.g. to the tank 10, will cause relatively large-amplitude movement of the vessel(s) in the liquid; the inertia of the total mass of the support system 20 to be overcome by this movement will in turn immediately damp all frequency components of the motion above the extremely low resonant frequency of the system 20. By comparison, energy imparted to the tank below the resonant frequency of the system 20 will result in common motion of the tank 10 and support system 20, while energy imparted to the tank 10 at the resonant frequency of the support system 20 will result in large-amplitude motion of the support system 20 with respect to the tank 10. For this reason, as discussed in detail below, the support system 20 may be configured as a detector of energy at its resonant frequency.

The support system 20, being supported at neutral buoyancy according to the invention, may accordingly be modeled by analogy to an extremely long spring having a relatively weak spring constant, such that addition of a small additional mass stretches the spring considerably. Such a system exhibits a very low resonant frequency. This will be intuitively apparent to those of skill in the art; one can readily envision that only relatively low frequency vibration will be effectively communicated from one end of such a spring to the other. More specifically, it is well accepted that the resonant frequency of such a system is a function solely of its static deflection. See, e.g., Crede, "Vibration and Shock Isolation" (1951), chapter 2, incorporated herein by reference, especially at equation 2.18.

According to the invention, as shown in FIG. 1, the buoyancy of a relatively large buoyant mass is controlled with respect to the density of the liquid 12 so that the total support system 20 experiences essentially neutral buoyancy. The supports 30 extending out of the liquid 12 are arranged to have minimal cross-sectional area (typically comprising perforated tubes as shown) so that when a small weight is placed on table 34, the amount of water displaced as the assembly sinks deeper into the liquid 12 is minimized. This allows the deflection of the system, that is, the degree of its additional immersion, to be relatively great proportional to the applied load. Therefore, according to the equation from Crede referred to above, the support system 20 according to the invention will exhibit a very low resonant frequency with respect to energy in the vertical direction.

The stability of the buoyant support system according to the invention with respect to pitch about a horizontal axis through its center of mass (CM in FIG. 1) is a function of the height of the center of buoyancy (CB in FIG. 1) with respect to the center of mass CM, both referring to the entire buoyant mass. The relative height of the center of mass CM can be adjusted with respect to the center of buoyancy CB, thus controlling the resistance of the system to pitch, by adjustment of the relative position of a auxiliary mass 42 with respect to the buoyant vessels 14 and 16. As mass 42 remains immersed in the liquid, variation of its relative position does not alter the effective buoyancy of the buoyant mass. A small vertical displacement of the center of mass CM with respect to the center of buoyancy CB results in a low "rocking" resonant frequency. Increasing the vertical spacing between the center of mass CM and the center of buoyancy CB increases the stability of the system, particularly its resistance to pitch about the horizontal axis. The stability of the support system of the invention is also a function of the horizontal spacing of the individual buoyant vessels 14 and 16, and their number.

The vibration isolation device of the invention when configured as a support for an experimental apparatus or prime mover, as in FIG. 1, desirably exhibits an extremely low resonant frequency. Accordingly, the vibration isolation device of the invention effectively filters out energy of all higher frequencies, and provides good isolation of an experimental apparatus 36 or a prime mover 38 from the environment. As indicated above, the resonant frequency of the device in the horizontal plane may be controlled by variation of the resilient characteristic of the connecting tubes 46 and 50, together with any additional anchoring members that may be employed.

The resonant frequency of the device in the vertical direction may be altered by varying the effective cross-sectional area of the tubular support members 30; doing so alters the amount of liquid displaced and hence the additional excursion of the vessel 14 into the liquid 12 upon a given weight being added to the table 34, or upon application of a given force thereto, such as vibratory energy. The effective cross-sectional area of the support members 30 may be conveniently varied, thus controlling the resonant frequency of the system, by variation of the position of a solid conical displacement member 54 (normally incorporated identically in each support member 30) with respect to the surface of the liquid 12.

Using the equations from the Crede text incorporated by reference above, applicant calculates that the resonant frequency in the vertical direction of a support system 20 generally as shown in FIG. 1, having a total mass of 100 pounds and including support member(s) 30 having a total cross-sectional area of one square inch, is 0.059 Hz. If the buoyancy and mass are divided equally between four vessels arranged in a square 20 inches on each side, and if the vertical displacement of the center of buoyancy CB from the center of mass CM is small, the system will exhibit a rotational resonant frequency, that is, with respect to pitch about a horizontal axis, of 0.08 Hz.

Use of the vibration isolation apparatus of the invention of FIG. 1 simply involves assembling the device to be supported on the table 34 and then adjusting the buoyancy of the individual vessel(s) 14, 16 so that overall neutral buoyancy is achieved. Support feet 52 may be provided to prevent damage to the vessels during buoyancy adjustment. The vertical position of the auxiliary mass 42 may be adjusted to control the spacing between the center of buoyancy CB and the center of mass CM of the overall system to provide adequate resistance to pitch and suitably low rocking frequency.

Figure 2:
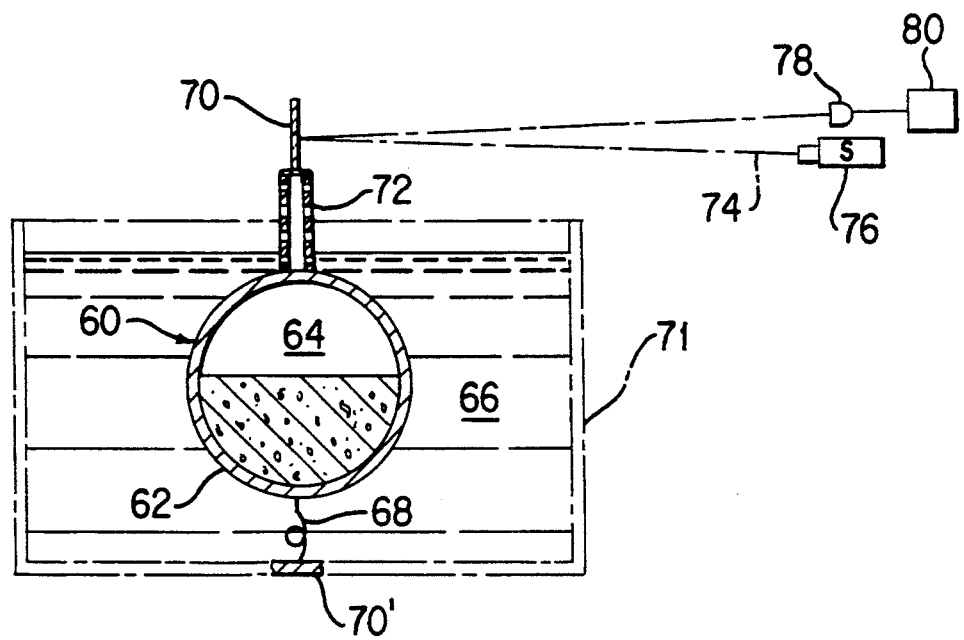

FIG. 2 shows the apparatus of the invention configured for use as a low resonant frequency oscillator. Again the apparatus of the invention comprises a vessel 60 containing a fixed or variable quantity of ballast 62 and a volume of gas 64. The volume of the gas space 64 and the mass of ballast 62 are adjusted so that the vessel 60 is of essentially neutral buoyancy within a particular body of water 66, such as a sea channel. Alternatively, the vessel 60 may be disposed in a tank 71 of liquid as shown in phantom, and disposed on a bridge, building or other large structure to monitor vibration thereof. The vessel 60 is anchored by a coil of resilient hose 68 or the like, so that vibration is not transmitted from the environment, typically the channel bottom 70, to the vessel 60. Vessel 60 is relatively massive and has neutral buoyancy. Accordingly, as described with reference to the apparatus of FIG. 1 above, vessel 60 acts as a driven oscillator having an extremely low resonant frequency. A set of such vessels having somewhat differing resonant frequencies, each being of neutral buoyancy in accordance with the invention, might be disposed in a ship channel and used to determine the frequency distribution of wave energy in the water 66. Relatively smaller vessels will have higher resonant frequencies than larger vessels. The resonant frequency of each vessel can also be controlled by the design of a member 72 extending out of the water, as explained above.

The low resonant frequencies of vessels 60 prevents them from oscillating with high amplitude except in response to wave energy at their resonant frequency. Accordingly, by monitoring the pattern of movement of the vessels 60 so as to determine whether any of these vessels 60 exhibit oscillation of high amplitude responsive to wave energy at their respective resonant frequencies, the frequency components of the wave energy in the water may be determined. Patterns of oscillation of high amplitude of various vessels 60 placed in a particular ship channel, e.g., responsive to the passage of various types of ships, can be analyzed over time to permit monitoring ship traffic in the channel. The mass of the driven oscillator of the invention shown in FIG. 2 may be adjusted to provide resonant frequencies in a wide range of frequencies of interest, so that wave energy of various frequencies can be effectively detected by detecting resonant oscillation of the vessel 60.

Motion of the vessel 60 is readily monitored by placing a mirror 70 on a perforated tubular support 72 extending up from the vessel 60, out of the water, and shining an interrogating light beam 74 from a source 76 onto the mirror 70 while detecting its reflection at 78. Signal processing circuitry shown schematically at 80, such as a computer carrying out Fourier transform frequency analysis, may be employed to provide an output signal responsive to the pattern of detection of the reflected light. Typically the mirror 70 is multifaceted so that some portion of the beam is detected by the detector regardless of rotation of the vessel 60. If oscillation of the vessel is excited by wave energy at its resonant frequency, the amplitude of its oscillation will be much greater than under other circumstances. The signal processing circuitry 80 can readily detect such a marked change in the pattern of reflection of the beam 74 from the source 76, and can provide an output indicative of the frequency components of wave energy in the water 66.

While an optical detector has been shown, other types of detectors decoupled mechanically from the vessel 60, that is, detectors not involving direct contact of the vessel with a reference object or measurement device, such as eddy current detectors or the like, could obviously be used. Where vessel 60 is disposed in a tank 71 of liquid and used to monitor vibration of a bridge, building or other large structure, the source 76 and detector 78 must be mounted on a separate structure, to ensure accurate detection of motion of the vessel 60. Similar optical detectors, or eddy current or other noncontacting sensors, could also be interposed between the apparatus of FIG. 1 and its environment to monitor motion thereof.

Having described preferred and alternative embodiments of a new and improved low resonant frequency vibration isolation system, and of an improved low resonant frequency oscillator, it is believed that other modifications, variations and changes thereto will be suggested to those skilled in the art in view of the teachings set forth herein. It is therefore to be understood that all such variations, modifications and changes are believed and intended to fall within the scope of the present invention as defined by the appended claims.

What is claimed is:

1. A low resonant frequency support system for effectively decoupling a support member from its environment, comprising:
   a tank containing a quantity of liquid of a given density;
   at least one buoyant vessel completely immersed in said liquid;
   a support member for receiving and supporting a load; and
   at least one weight-bearing member of minimal cross-sectional area extending substantially vertically from said buoyant vessel out of said liquid and fixed to said support member, so that said vessel supports said support member;
   wherein the total mass of said vessel, said support member, said weight-bearing member and said load is selected with respect to the density of said liquid such that said total mass is solely supported with essentially neutral buoyancy by said liquid.

2. The support system of claim 1, wherein each of said buoyant vessels comprises a quantity of ballast and a gas-filled volume.

3. The support system of claim 2, where a plurality of said vessels are provided, said vessels being substantially rigidly linked to one another such that said vessels exhibit unitary buoyancy characteristics.

4. The support system of claim 2, further comprising means for controllably altering the amount of ballast comprised by each of said buoyant vessels for selective adjustment of the buoyancy of said buoyant vessels.

5. The support system of claim 4, wherein said means for altering the amounts of ballast comprised by each of said buoyant vessels comprises means for pumping fluid into said buoyant vessels.

6. The support system of claim 5, wherein said means for pumping fluid into said buoyant vessels comprises one or more resilient hoses connecting said buoyant vessels to the environment of said support member.

7. The support system of claim 6, wherein said resilient hoses further locate said buoyant vessels within said tank.

8. The support system of claim 2, wherein each said buoyant vessels comprises a sealed chamber having fluid ballast in a lower portion thereof, and a quantity of gas confined in said chamber above said fluid ballast.

9. The support system of claim 2, further comprising an auxiliary mass immersed in said liquid and mounted rigidly to said buoyant vessels by means permitting adjustment of the relative vertical position of said auxiliary mass with respect to said gas-filled volume to thereby adjust the vertical spacing of the center of mass and center of buoyancy of the support system.

10. The support system of claim 1, wherein the resonant frequency of said assembly in the vertical direction is adjusted by variation of the amount of said fluid displaced upon variation in the depth of immersion of said at least one buoyant vessel in said tank of liquid.

11. The support system of claim 1, further comprising resilient means for anchoring said buoyant vessels within said tank.

12. The support system of claim 11, wherein the resiliency of said means for anchoring is selected to determine the resonant frequency of said buoyant vessels in the horizontal plane.

13. The support system of claim 1 wherein the system has a resonant vertical vibration frequency less than 0.1 Hz determined by said total mass and said minimal cross-sectional area.

14. A method for stably supporting an experimental apparatus while effectively decoupling the apparatus from vibrations in a known range of frequencies said, method comprising the steps of:
   completely immersing at least one vessel having a volume of gas and a quantity of ballast therein in a tank of liquid;
   assembling the experimental apparatus on a support structure extending from said vessel out of said liquid;
   minimizing changes in amounts of said liquid displaced in response to changes in the immersion depth of said vessel by configuring said support structure with a much smaller solid horizontal cross-section than said vessel;
   selectively adjusting the amount of ballast and/or gas volume in said vessel until the total mass of the vessel, the experimental apparatus, and the support structure achieves neutral buoyancy with respect to the liquid in said tank; and
   selecting said total mass and said solid horizontal cross-section such that the resonant vertical vibration frequency of the combined apparatus vessel and support structure is much lower than said range of frequencies.

15. The method of claim 14, comprising the further step of selectively adjusting the resistance of the total mass to pitch about a horizontal axis by adjusting the relative vertical spacing of the center of buoyancy and the center of mass of the total mass.

16. The method of claim 15, wherein said step of selectively adjusting the spacing of the center of buoyancy with respect to the center of mass is performed by adjusting the vertical position of an auxiliary mass carried within said liquid and rigidly affixed to said at least one vessel.

17. The method of claim 16, wherein the amount of ballast within said vessel is adjusted by pumping a quantity of liquid into said vessel via piping means adapted to resist transmission of vibration from a source external to said tank to said vessel.

18. The method of claim 14, comprising the further step of selecting the resonant frequency of said vessel by selecting resilient anchoring means to anchor the vessel within the tank of liquid.

19. A low resonant frequency support system for decoupling a support table from vibrations in a known range of frequencies, said system comprising:
   a tank of a quantity of liquid of given density, said quantity of liquid having an exposed top surface disposed below said support table;
   at least one closed buoyant vessel completely immersed in said liquid;
   at least one structurally rigid support member secured to and extending between said vessel and said support table, and extending from below to above said surface of aid liquid, for supporting said support table on said vessel; and
   means for minimizing changes in amounts of said liquid displaced in response to changes in immersion level of said vessel, said means comprising the solid horizontal cross-section of said support member being much smaller than the horizontal cross-section of said vessel;
   wherein the total mass of said vessel combined with said support member and said support table, and the buoyancy of said vessel, are selected with respect to the density of said liquid such that said total mass is solely supported at essentially neutral buoyancy by said liquid; and
   wherein said solid horizontal cross-section of said support member and said total mass are selected such that the resonant vibration frequency in the vertical direction of the combined support table, support member and vessel is much lower than said range of frequencies.

20. The support system of claim 19 wherein said vessel contains a quantity of ballast and a gas-filled volume, and further comprising means for selectively varying the amount of ballast in said vessel when said vessel is completely immersed in said liquid.

21. A method for both supporting a support table and decoupling the support table from vibrations in a known frequency range, said method comprising the steps of:
   (a) completely immersing a buoyant vessel in a body of liquid below the surface of said body of liquid, said liquid having a known density;
   (b) supporting said table above said surface solely with said buoyant vessel;
   (c) minimizing changes in amounts of said liquid displaced n response to changes in the submersion level of said vessel in said body of liquid by interconnecting said support table and said vessel only with one or more support members extending from below to above said surface and having a solid horizontal cross-section much smaller than said vessel;
   (d) selecting the buoyancy of said vessel, and selecting the total mass of said vessel, support table and support member, relative to the density of said liquid such that said total mass has neutral buoyancy; and
   (e) selecting said total mass and said solid horizontal cross-section of said support members such that the resonant vibration frequency in the vertical direction of the combined support table, support member and vessel is much lower than said range of frequencies.

22. The method of claim 21 comprising the further step of selectively adjusting the resistance of the total mass to pitch about a horizontal axis by adjusting the relative vertical spacing of the center of buoyancy and the center of mass of said total mass.

* * * * *